US012187053B2

(12) United States Patent
Sumii et al.

(10) Patent No.: US 12,187,053 B2
(45) Date of Patent: Jan. 7, 2025

(54) LIQUID EJECTING APPARATUS, METHOD FOR CONTROLLING LIQUID EJECTING APPARATUS, AND NON-TRANSITORY COMPUTER-READABLE STORAGE MEDIUM PRELIMINARY

(71) Applicant: SEIKO EPSON CORPORATION, Tokyo (JP)

(72) Inventors: Atsushi Sumii, Shiojiri (JP); Keisuke Niwa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 18/154,830

(22) Filed: Jan. 15, 2023

(65) Prior Publication Data

US 2023/0226837 A1 Jul. 20, 2023

(30) Foreign Application Priority Data

Jan. 18, 2022 (JP) ................................ 2022-005596
Mar. 23, 2022 (JP) ................................ 2022-046494
Sep. 5, 2022 (JP) ................................ 2022-140568

(51) Int. Cl.
*B41J 29/17* (2006.01)

(52) U.S. Cl.
CPC .................................... *B41J 29/17* (2013.01)

(58) Field of Classification Search
CPC ................................ B41J 29/17; B41J 11/007
See application file for complete search history.

(56) References Cited

U.S. PATENT DOCUMENTS

2021/0291559 A1* 9/2021 Aoki ........................ B41J 29/17

FOREIGN PATENT DOCUMENTS

JP 2001-179953 A 7/2001
JP 3190073 U 3/2014

* cited by examiner

*Primary Examiner* — Lisa Solomon
(74) *Attorney, Agent, or Firm* — WORKMAN NYDEGGER

(57) ABSTRACT

When at least a part of a cleaning region is located downstream of a contact position where a cleaner is in contact with a transport belt in a normal rotation direction of the transport belt during cleaning of a cleaning region, the control portion can perform cleaning position adjustment control to reversely rotate the transport belt so that an entire of the cleaning region is located upstream of the contact position in the normal rotation direction, before the cleaner is switched from a separation state to a contact state.

14 Claims, 13 Drawing Sheets

LIQUID EJECTING APPARATUS, METHOD FOR CONTROLLING LIQUID EJECTING APPARATUS, AND NON-TRANSITORY COMPUTER-READABLE STORAGE MEDIUM PRELIMINARY

The present application is based on, and claims priority from JP Application Serial Number 2022-005596, filed Jan. 18, 2022, JP Application Serial Number 2022-046494, filed Mar. 23, 2022 and JP Application Serial Number 2022-140568, filed Sep. 5, 2022, the disclosures of which are hereby incorporated by reference herein in their entirety.

BACKGROUND

1. Technical Field

The present disclosure relates to a liquid ejecting apparatus that ejects a liquid onto a medium. In addition, the present disclosure relates to a method for controlling a liquid ejecting apparatus and a non-transitory computer-readable storage medium.

2. Related Art

In a liquid ejecting apparatus represented by an ink jet printer, a configuration has been known in which a transport belt is used to transport a medium, which is represented by recording paper. Further, in such a configuration, a configuration may be employed in which the transport belt with adhered ink is cleaned by a blade.

The blade disclosed in JP-A-2001-179953 is made of a urethane rubber coated with fluorine resin and provided to make contact with and separate from the transport belt.

When the ink is ejected in a state where there is no medium on the transport belt due to the occurrence of a jam of the medium, that is, when the ink is erroneously ejected, an ink landing region on the transport belt, that is, at least a part of a cleaning region where cleaning is to be performed by the blade may have passed through a contact position where the blade is in contact with the transport belt.

In this case, for example, when the blade makes contact with a middle of the cleaning region in a state where the blade is switched from a separation state to a contact state, the blade cleans the cleaning region from the middle of the cleaning region. Therefore, it is necessary to rotate the transport belt once in a normal rotation direction in order to clean the entire of the cleaning region. In addition, when the entire of the cleaning region has passed through the contact position in a state where the blade is switched from the separation state to the contact state, it is necessary to normally rotate the transport belt until the cleaning region faces the blade. In any of the cases described above, in order to clean the entire of the cleaning region once, it takes time to complete the cleaning since an amount of normal rotation of the transport belt increases. The reverse rotation of the transport belt in a state where the blade is in contact with the transport belt is not preferable because the ink may adhere to an unintended part of the blade.

SUMMARY

A liquid ejecting apparatus of the present disclosure includes: a liquid ejecting portion that ejects a liquid onto a medium; a transport belt that faces the liquid ejecting portion and rotates in a normal rotation direction to transport the medium downstream in a transport direction; a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state when cleaning the transport belt; and a control portion that controls an ejecting operation of the liquid by the liquid ejecting portion, a rotating operation of the transport belt, and switching of a state of the cleaner, in which when at least a part of the cleaning region is located downstream of the contact position where the cleaner is in contact with the transport belt in the normal rotation direction of the transport belt, the control portion is configured to execute cleaning position adjustment control to rotate the transport belt in a reverse rotation direction opposite to the normal rotation direction so that an entire of the cleaning region is located upstream of the contact position in the normal rotation direction, before the cleaner is switched from the separation state to the contact state.

In addition, a method for controlling a liquid ejecting apparatus is a method for controlling a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state during cleaning of the transport belt, and the method includes: rotating the transport belt in a reverse rotation direction opposite to the normal rotation direction so that an entire of the cleaning region is located upstream of the contact position in the normal rotation direction before the cleaner is switched from the separation state to the contact state, when at least a part of the cleaning region is located downstream of the contact position where the cleaner is in contact with the transport belt in the normal rotation direction of the transport belt during cleaning of the cleaning region.

In addition, a non-transitory computer-readable storing medium of the present disclosure storing a program, in which the program is a program executed by a control portion of a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state during cleaning of the transport belt, and the program includes: determining whether or not at least a part of the cleaning region during cleaning of the cleaning region is provided downstream of a contact position where the cleaner is in contact with the transport belt in a normal rotation direction of the transport belt; and rotating the transport belt in a reverse rotation direction opposite to the normal rotation direction so that an entire of the cleaning region is located upstream of the contact position in the normal rotation direction before the cleaner is switched from the separation state to the contact state, when at least a part of the cleaning region is located downstream of the contact position in the normal rotation direction.

DESCRIPTION OF EXEMPLARY EMBODIMENTS

Figure 1:
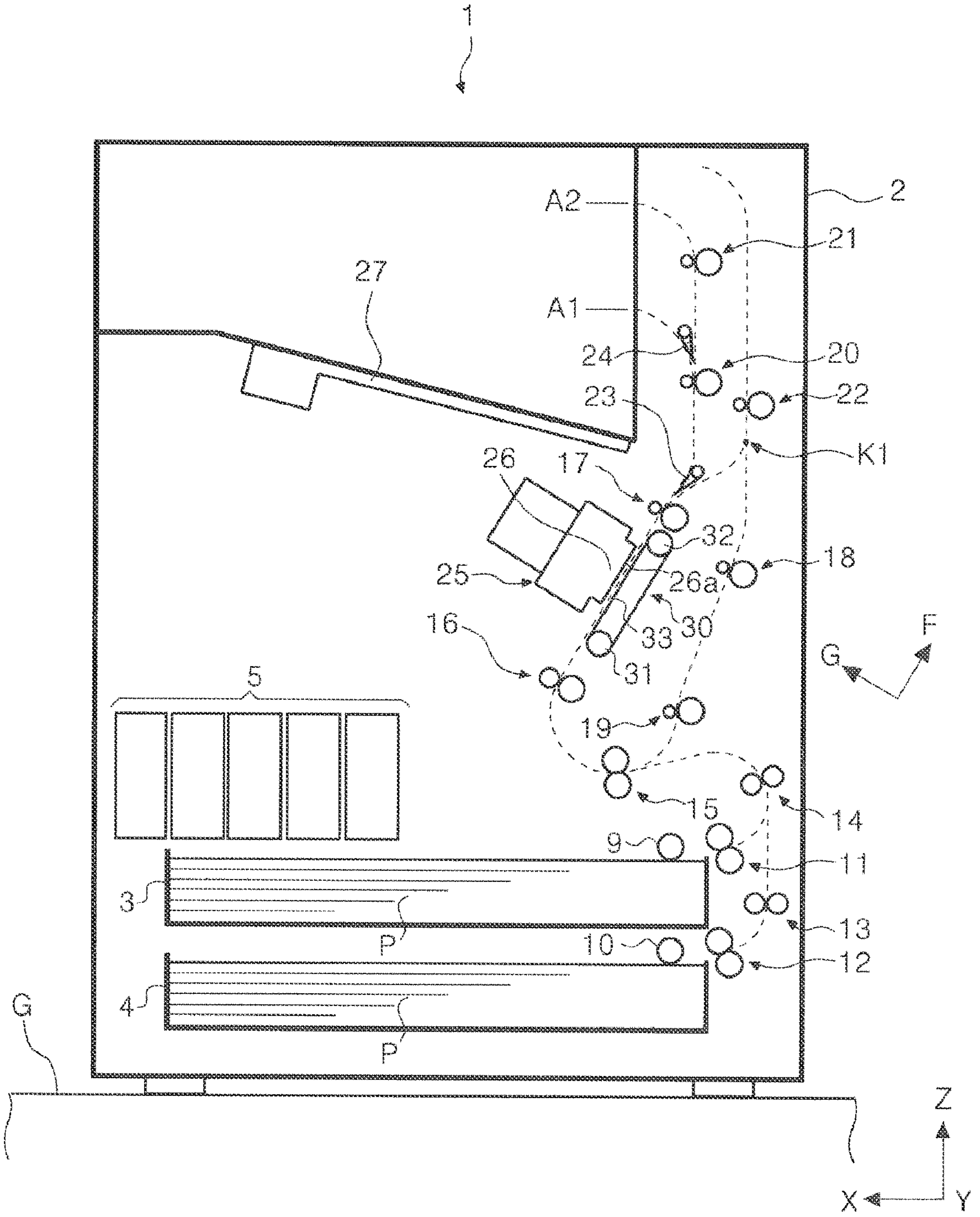
FIG. 1 is a view illustrating a medium transport path of a printer.

Hereinafter, the present disclosure will be schematically described.

According to a first aspect, a liquid ejecting apparatus includes: a liquid ejecting portion that ejects a liquid onto a medium; a transport belt that faces the liquid ejecting portion and rotates in a normal rotation direction to transport the medium downstream in a transport direction; a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state during cleaning of the transport belt; and a control portion that controls an ejecting operation of the liquid by the liquid ejecting portion, a rotating operation of the transport belt, and switching of a state of the cleaner, in which when at least a part of the cleaning region is located downstream of the contact position where the cleaner is in contact with the transport belt in the normal rotation direction of the transport belt during cleaning of the cleaning region, the control portion is configured to execute cleaning position adjustment control to rotate the transport belt in a reverse rotation direction opposite to the normal rotation direction so that an entire of the cleaning region is located upstream of the contact position in the normal rotation direction, before the cleaner is switched from the separation state to the contact state.

According to the aspect, when at least a part of the cleaning region is located downstream of the contact position where the cleaner is in contact with the transport belt in the normal rotation direction of the transport belt during cleaning of the cleaning region, the control portion can execute the cleaning position adjustment control to reversely rotate the transport belt so that the entire of the cleaning region is located upstream of the contact position in the normal rotation direction, before the cleaner is switched from the separation state to the contact state. Therefore, an amount of normal rotation of the transport belt required to clean the entire of the cleaning region once can be suppressed, and a time required to complete the cleaning can be reduced.

According to a second aspect, in the first aspect, in the cleaning position adjustment control, the control portion rotates the transport belt in the reverse rotation direction so that a downstream end of the cleaning region in the normal rotation direction faces the contact position.

According to the aspect, the control portion reversely rotates the transport belt in the cleaning position adjustment control so that the downstream end of the cleaning region in the normal rotation direction faces the contact position, such that an amount of reverse rotation of the transport belt can be minimized, and the time to complete the cleaning can be further reduced in the cleaning position adjustment control.

According to a third aspect, in the first or second aspect, the cleaner includes a blade, and the blade is switched to the contact state while forming a predetermined angle to a direction normal to a surface of the transport belt, when the blade is switched from the separation state to the contact state.

In a configuration in which the blade is switched to the contact state while forming the predetermined angle to the direction normal to the surface of the transport belt, a side surface of the blade makes contact with the transport belt. In such a configuration, when the side surface of the blade makes contact with the middle of the cleaning region, the liquid adheres to the side surface of the blade, that is, to a place that is not originally used for cleaning, a cleaning effect may thus be adversely affected.

However, according to the first aspect, the side surface of the blade does not make contact with the middle of the cleaning region, such that it is possible to avoid adversely affecting the cleaning effect.

According to a fourth aspect, in the third aspect, the transport belt is wound around a first pulley and a second pulley, and the blade is provided at a position where the transport belt is sandwiched between the blade and the second pulley in the contact state.

According to the aspect, the blade is provided at the position where the transport belt is sandwiched between the blade and the second pulley in the contact state, such that the transport belt does not escape inside when the blade makes contact with the transport belt, and the cleaning effect can be enhanced.

According to a fifth aspect, in the fourth aspect, the second pulley is located downstream of a region facing the liquid ejecting portion when the transport belt rotates in the normal rotation direction.

According to the aspect, the second pulley is located downstream of the region facing the liquid ejecting portion when the transport belt rotates in the normal rotation direction, such that a space can be secured downstream of the cleaner in the normal rotation direction on a side opposite to the region of the transport belt facing the liquid ejecting portion. As a result, it is possible to enhance a degree of freedom in arrangement of other configurations other than the cleaner.

According to a sixth aspect, in any one of the first to fifth aspects, the transport belt has a first section that is a flat section and includes a region facing the liquid ejecting portion, the cleaning region is a region where the liquid is erroneously ejected from the liquid ejecting portion, and when the first section includes at least a part of the cleaning region, the control portion executes cleaning region movement control to rotate the transport belt in the normal rotation direction until the cleaning region is at least out of the first section before executing the cleaning position adjustment control.

When a user tries to remove the medium remaining on the transport belt in a state where the liquid is erroneously ejected to the transport belt, the user touches an erroneously ejected region, resulting in contamination of fingers. However, according to the aspect, when the first section includes at least the part of the cleaning region, the control portion executes the cleaning region movement control to rotate the transport belt in the normal rotation direction until the cleaning region is at least out of the first section, such that it is possible to prevent the touch to the erroneously ejected region by the user.

According to a seventh aspect, in the sixth aspect, the transport belt has a second section that is a flat section and located opposite to the first section, and the control portion rotates the transport belt in the normal rotation direction until the entire of the cleaning region enters the second section in the cleaning region movement control.

According to the aspect, the control portion rotates the transport belt in the normal rotation direction until the entire of the cleaning region enters the second section in the cleaning region movement control, such that it is possible to reliably prevent the touch to the erroneously ejected region by the user.

According to an eighth aspect, in the seventh aspect, in the cleaning region movement control, the control portion stops the transport belt in a state where the entire of the cleaning region is located upstream in the second section after the entire of the cleaning region enters the second section.

According to the aspect, in the cleaning region movement control, the control portion stops the transport belt in a state where the entire of the cleaning region is located upstream in the second section after the entire of the cleaning region enters the second section, such that it is possible to suppress the amount of reverse rotation of the transport belt when performing cleaning position adjustment control after the transport belt is stopped, and to quickly start a cleaning operation of the transport belt.

According to a ninth aspect, in any one of the sixth to eighth aspects, after executing the cleaning region movement control, the control portion suspends the cleaning position adjustment control until an input instruction is received from the user, and executes the cleaning position adjustment control when receiving the input instruction.

According to the aspect, the control portion executes the cleaning position adjustment control after receiving the input instruction from the user, such that it is possible to reliably prevent the touch to the erroneously ejected region by the user.

According to a tenth aspect, in any one of the first to ninth aspects, the liquid ejecting apparatus further includes a contact portion that is in contact with the transport belt and is provided downstream of the contact position in the normal rotation direction of the transport belt.

According to the aspect, in the configuration including the contact portion that is in contact with the transport belt and is provided downstream of the contact position in the normal rotation direction of the transport belt, the contact portion can be easily contaminated with the liquid, but the cleaner is located upstream of the contact portion, such that it is possible to prevent the contamination of the contact portion.

According to an eleventh aspect, in any one of the first to tenth aspects, the cleaner is a first cleaner, and a second cleaner that cleans the transport belt is provided downstream of the contact position in the normal rotation direction of the transport belt.

According to the aspect, the cleaner is the first cleaner, and the second cleaner that cleans the transport belt is provided downstream of the contact position in the normal rotation direction of the transport belt, such that it is possible to enhance the cleaning effect of the transport belt.

According to a twelfth aspect, in the eleventh aspect, the second cleaner includes a ring shaped cleaning body that cleans the transport belt, and a reinforcing body that adheres to an inner periphery of the cleaning body and reinforces the cleaning body.

According to the aspect, the reinforcing body enhances rigidity of the second cleaner, such that wrinkles or deviation of the second cleaner can be suppressed and a cleaning property can be improved. In addition, because the second cleaner is formed in a ring shape, it is possible to reduce in size and costs of the apparatus in comparison to a method for winding an elongated cleaner.

According to a thirteenth aspect, a control method is a method for controlling a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state during cleaning of the transport belt, and the method includes: rotating the transport belt in a reverse rotation direction opposite to the normal rotation direction so that an entire of the cleaning region is located upstream of the contact position in the normal rotation direction before the cleaner is switched from the separation state to the contact state, when at least a part of the cleaning region is located downstream of the contact position where the cleaner is in contact with the transport belt in the normal rotation direction of the transport belt during cleaning of the cleaning region.

According to the aspect, when at least a part of the cleaning region is located downstream of the contact position where the cleaner is in contact with the transport belt in the normal rotation direction of the transport belt during cleaning of the cleaning region, the transport belt rotates reversely so that the entire of the cleaning region is located upstream of the contact position in the normal rotation direction, before the cleaner is switched from the separation state to the contact state. Therefore, an amount of normal rotation of the transport belt required to clean the entire of the cleaning region once can be suppressed, and a time required to complete the cleaning can be reduced.

According to a fourteenth aspect, a non-transitory computer-readable storing medium of the present disclosure storing a program, in which the program is a program executed by a control portion of a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state during cleaning of the transport belt, and the program includes: determining whether or not at least a part of the cleaning region during cleaning of the cleaning region is provided downstream of a contact position where the cleaner is in contact with the transport belt in a normal rotation direction of the transport belt; and rotating the transport belt in a reverse rotation direction opposite to the normal rotation direction so that an entire of the cleaning region is located upstream of the contact position in the normal rotation direction before the cleaner is switched from the separation state to the contact state, when at least a part of the cleaning region is located downstream of the contact position in the normal rotation direction.

According to the aspect, when at least a part of the cleaning region is located downstream of the contact position where the cleaner is in contact with the transport belt in the normal rotation direction of the transport belt during cleaning of the cleaning region, the transport belt rotates reversely so that the entire of the cleaning region is located upstream of the contact position in the normal rotation direction, before the cleaner is switched from the separation state to the contact state. Therefore, an amount of normal rotation of the transport belt required to clean the entire of the cleaning region once can be suppressed, and a time required to complete the cleaning can be reduced.

Hereinafter, the present disclosure will be described in detail.

An ink jet printer 1 that ejects a liquid represented by ink and performs recording on a medium represented by recording paper will be described by way of example of the liquid ejecting apparatus. Hereinafter, the ink jet printer 1 is simply referred to as a printer 1.

In each drawing, an X-Y-Z coordinate system is an orthogonal coordinate system, in which a Y-axis direction represents a width direction intersecting a transport direction of a medium, and also represents an apparatus depth direction. In the Y-axis direction, a +Y direction represents a direction from the front of the apparatus toward the back of the apparatus, and a −Y direction represents a direction from the back of the apparatus toward the front of the apparatus.

An X-axis direction represents an apparatus width direction, in which a +X direction, which is a direction indicated by an arrow, represents the left side, and a −X direction opposite to the +X direction represents the right side, when viewed from an operator of the printer 1. A Z-axis direction represents a vertical direction, that is, an apparatus height direction, in which a +Z direction, which is a direction indicated by an arrow, represents an upward direction, and a −Z direction opposite to the +Z direction represents a downward direction.

Moreover, a G-axis direction represents a direction normal to an ink ejection surface 26*a* of a line head 26, which will be described later. In addition, an F-axis direction, which is a direction in parallel to the ink ejection surface 26*a*, represents a medium transport direction at a position facing the ink ejection surface 26*a*, in which a +F direction, which is a direction indicated by an arrow, represents a downstream of the transport direction, and a −F direction opposite to the +F direction represents an upstream of the transport direction. Hereinafter, a direction in which the medium is sent may be referred to as a “downstream”, and a direction opposite to the direction in which the medium P is sent may be referred to as an “upstream”.

In FIG. 1, a medium transport path is indicated by a broken line. A medium in the printer 1 is transported through the medium transport path indicated by the broken line.

An apparatus body 2 of the printer 1 includes a first medium cassette 3 and a second medium cassette 4 for accommodating the medium before feeding. Reference numeral P represents a medium accommodated in each medium cassette. The first medium cassette 3 and the second medium cassette 4 are provided on the apparatus body 2 so as to be detachable from an apparatus front side.

The first medium cassette 3 is provided with a pick roller 9 for sending out the accommodated medium, and the second medium cassette 4 is provided with a pick roller 10 for feeding the accommodated medium.

The first medium cassette 3 is provided with a feeding roller pair 11 for feeding the sent-out medium in an obliquely upward direction. The second medium cassette 4 is provided with a feeding roller pair 12 for feeding the sent-out medium in the obliquely upward direction, and a transport roller pair 13 for transporting the medium in an upward direction.

The term “roller pair” herein refers to a roller pair including a drive roller that is driven by a motor (not illustrated) and a driven roller that is driven to rotate in contact with the drive roller, unless otherwise described.

The medium sent out from each medium cassette is sent to a transport roller pair 16 by a transport roller pair 14 and a transport roller pair 15. The medium receiving a sending force from the transport roller pair 16 is sent to a position between the line head 26 and the transport belt 33, that is, a position facing the line head 26.

A head unit 25 includes the line head 26, and the line head 26 ejects ink, which is an example of a liquid, to a surface of the medium and performs recording. The line head 26 is an ink ejecting head that is configured such that a nozzle (not illustrated) ejecting the ink covers the entire region in a medium width direction, and is configured as an ink ejecting head capable of performing recording on the entire width of the medium without moving in the medium width direction. The line head 26 is an example of a liquid ejecting portion that ejects the liquid.

However, the ink ejecting head may be a type that performs recording in accordance with a movement in the medium width direction.

The head unit 25 can move in the G-axis direction by a driving source (not illustrated). A control portion 50 (see FIG. 2) controls the movement of the head unit 25 in the G-axis direction.

Reference numeral 5 represents an ink accommodating portion accommodating the ink. The ink ejected from the line head 26 is supplied from the ink accommodating portion 5 to the line head 26 through a tube (not illustrated). The ink accommodating portion 5 includes a plurality of ink tanks disposed along the X-axis direction.

The transport belt 33, a driving pulley 31, and a driven pulley 32 constitute a belt unit 30. The transport belt 33 is an endless belt that is wound around the driving pulley 31 and the driven pulley 32. The driving pulley 31 is driven by a belt drive motor 57 (see FIG. 2) to rotate the transport belt 33.

The medium is transported to a position facing the line head 26 while being adsorbed to the transport belt 33. The adsorption of the medium to the transport belt 33 will be described later.

In this case, the medium transport path passing through the position facing the line head 26 intersects both the horizontal direction and the vertical direction, and transports the medium in the obliquely upward direction. The obliquely upward transport direction represents a direction including a −X direction component and a +Z direction component in FIG. 1, and with such a configuration, it is possible to suppress a dimension of the printer 1 in the horizontal direction.

In the present embodiment, the medium transport path passing through the position facing the line head 26 is set to have an inclination angle within a range of 50° to 70°, and more specifically, an inclination angle of 60°.

The medium on which a first surface has been recorded by the line head 26 is sent in a more obliquely upward direction by a transport roller pair 17 located on a downstream of the transport belt 33.

A flap 23 is provided on a downstream of the transport roller pair 17, and the medium transport direction is changed by the flap 23. When the medium is discharged as it is, the medium transport path is changed by the flap 23 such that the medium is transported upward toward a transport roller pair 20. A flap 24 is further provided on a downstream of the transport roller pair 20, and the transport path is changed by the flap 24 to either a path to discharge the medium from a discharge position A1 or a path to transport the medium to a transport roller pair 21 located further vertically upward. When the medium is sent to the transport roller pair 21, the medium is discharged from a discharge position A2.

The medium discharged from the discharge position A1 is received by a discharge tray 27 that is inclined in an obliquely upward direction including the +X direction component and the +Z direction component. The medium discharged from the discharge position A2 is received by an option tray (not illustrated).

When a second surface is further recorded in addition to the first surface of the medium, the medium is sent in the obliquely upward direction including a −X direction component and the +Z direction component by the flap 23, passes through a branching position Kl, and is sent to a switch back path upward from the branching position Kl. A transport roller pair 22 is provided in the switch back path. The medium entering the switch back path is transported in an upward direction by the transport roller pair 22, an upstream end of the medium passes through the branching position Kl, and then a rotating direction of the transport roller pair 22 is changed, and the medium is thus transported in a downward direction.

The medium transported in the downward direction by the transport roller pair 22 arrives at a transport roller pair 18, a transport roller pair 19, and the transport roller pair 16 by receiving the sending force from the transport roller pair 15, and the medium is sent to a position facing the transport belt 33 again by the transport roller pair 16.

In the medium sent to the position facing the line head 26 again, the second surface opposite to the first surface on which the recording has been already performed faces the line head 26. As a result, the second surface of the medium can be recorded by the line head 26. The medium on which the second surface has been recorded is discharged from the discharge position A1 or the discharge position A2 described above.

Next, the belt unit 30, a first cleaning portion 35, and a second cleaning portion 40 will be described with reference to FIGS. 3, 4, and 5.

The transport belt 33 constituting the belt unit 30 is an endless belt containing a conductive material as needed for adjusting a resistance value in a base material made of urethane, rubber, or the like, and is wound around the driving pulley 31 located upstream thereof and the driven pulley 32 located downstream thereof. The transport belt 33 is applied with a predetermined tension by a tensioner (not illustrated).

The driving pulley 31 is an example of a first pulley, and the driven pulley 32 is an example of a second pulley.

Figure 2:
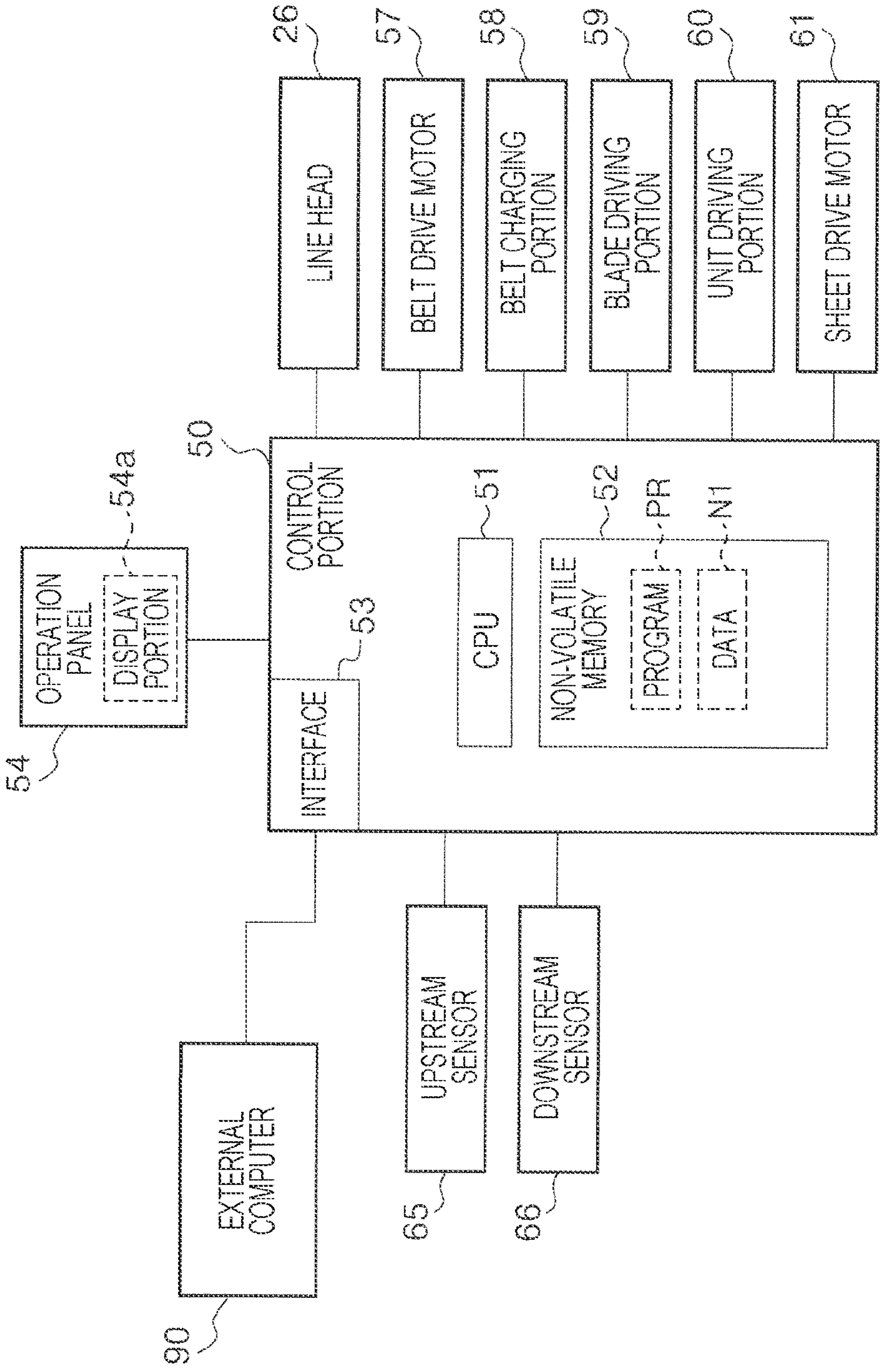
FIG. 2 is a block diagram illustrating a control system of the printer.

The driving pulley 31 is rotatably driven by a belt drive motor 57 (see FIG. 2) controlled by the control portion 50 (see FIG. 2). When the driving pulley 31 is rotatably driven in a direction of arrow a, the transport belt 33 rotates in a clockwise direction in FIGS. 3 and 4. Hereinafter, the rotation of the transport belt 33 may be referred to as "normal rotation".

Figure 3:
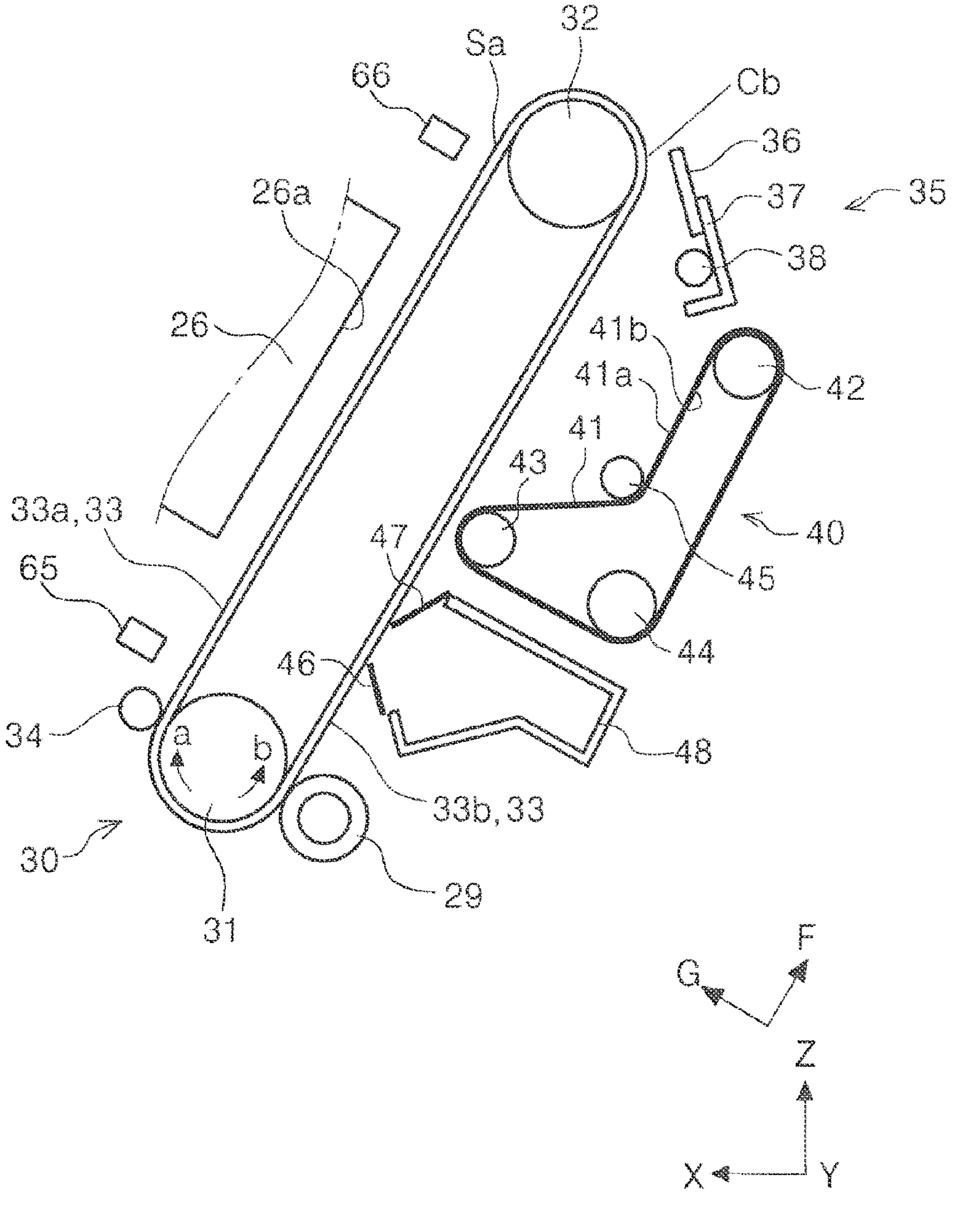
FIG. 3 is a side view of a transport belt, a first cleaning portion, and a second cleaning portion.
Figure 4:
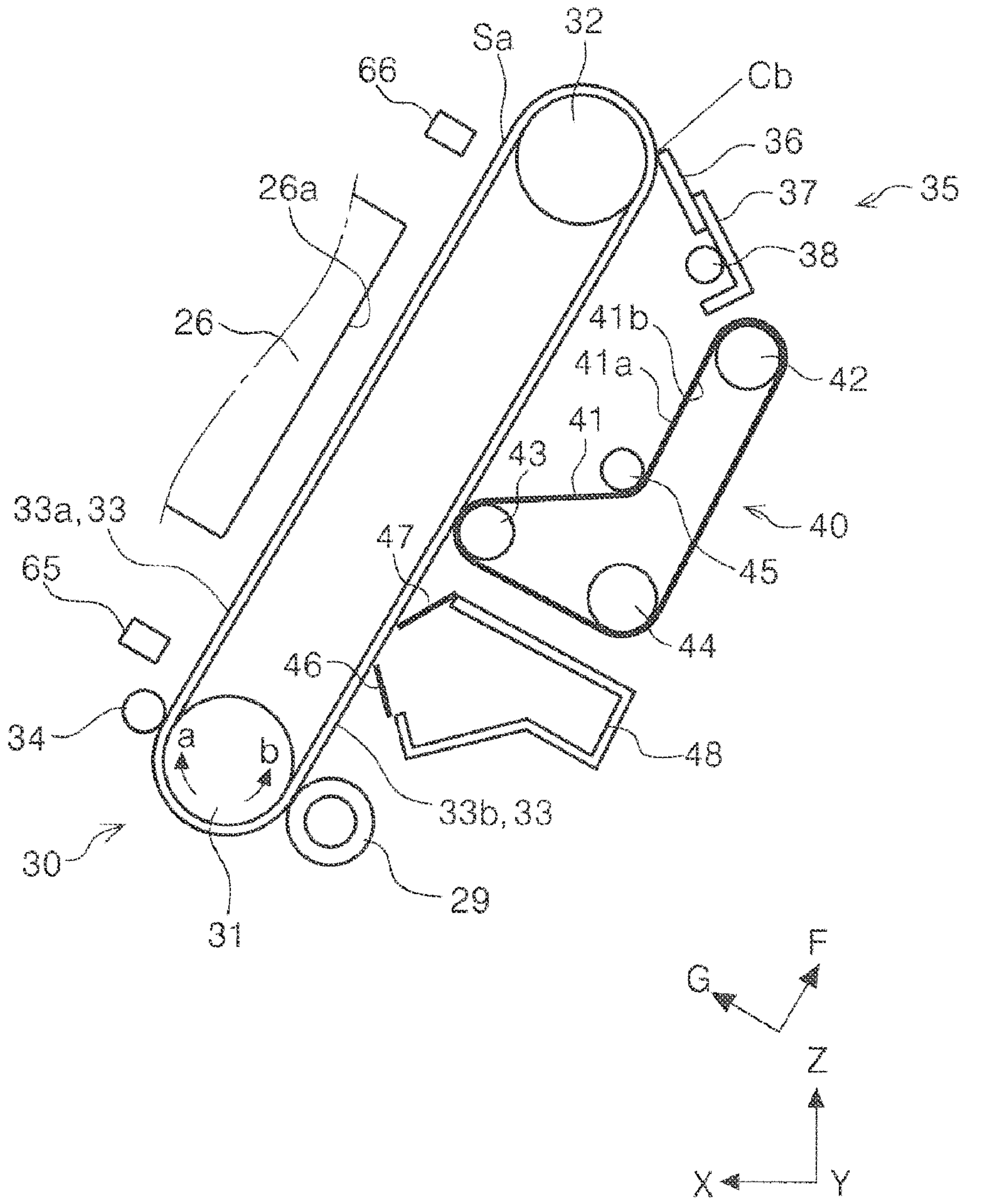
FIG. 4 is a side view of the transport belt, the first cleaning portion, and the second cleaning portion.

When the driving pulley 31 is rotatably driven in a direction of arrow b, the transport belt 33 rotates in a counterclockwise direction in FIGS. 3 and 4. Hereinafter, the rotation of the transport belt 33 may be referred to as "reverse rotation".

The transport belt 33 is wound around the driving pulley 31 and the driven pulley 32, thereby forming a first section 33*a* and a second section 33*b* as flat belt sections. The first section 33*a* is a section facing the line head 26, and the second section 33*b* is a section opposite to the first section 33*a*. In the present embodiment, the first section 33*a* and the second section 33*b* do not include a portion of the transport belt 33 around the driving pulley 31 and a portion of the transport belt 33 around the driven pulley 32.

When the transport belt 33 rotates normally, the first section 33*a* of the transport belt 33 moves in the +F direction, and the second section 33*b* moves in the −F direction. That is, in the first section 33*a*, the −F direction represents upstream of the transport belt 33 in the normal rotation direction, and the +F direction represents downstream of the transport belt 33 in the normal rotation direction. In addition, in the second section 33*b*, the +F direction represents upstream of the transport belt 33 in the normal rotation direction, and the −F direction represents downstream of the transport belt 33 in the normal rotation direction. In addition, in the section of the transport belt 33 wound around the driven pulley 32, the clockwise direction in FIG. 3 represents downstream in the normal rotation direction, and the counterclockwise direction thereof represents upstream in the normal rotation direction.

When the transport belt 33 rotates normally, the first section 33*a* of the transport belt 33 moves in the −F direction, and the second section 33*b* moves in the +F direction. That is, in the first section 33*a*, the +F direction represents upstream of the transport belt 33 in the reverse rotation direction, and the −F direction represents downstream of the transport belt 33 in the normal rotation direction. In addition, in the second section 33*b*, the −F direction represents upstream of the transport belt 33 in the reverse rotation direction, and the +F direction represents downstream of the transport belt 33 in the reverse rotation direction. In addition, in the section of the transport belt 33 wound around the driven pulley 32, the clockwise direction in FIG. 3 represents upstream of the transport belt 33 in the reverse rotation direction, and the counterclockwise direction thereof represents downstream of the transport belt 33 in the reverse rotation direction.

Next, a charging roller 29 is provided at a position facing the driving pulley 31 with the transport belt 33 interposed between the driving pulley 31 and the charging roller 29.

The charging roller 29 is in contact with an outer peripheral surface of the transport belt 33, and is rotatably driven in accordance with the rotation of the transport belt 33. The charging roller 29 is applied with a direct current by a belt charging portion 58 (see FIG. 2), and accordingly, the charging roller 29 supplies a charge to a portion in contact with the transport belt 33. The belt charging portion 58 (see FIG. 2) is controlled by the control portion 50, and on/off switching of the voltage applied to the charging roller 29 is performed, and the voltage applied to the charging roller 29 is switched.

In the present embodiment, the charging roller 29 supplies a positive charge to the transport belt 33, and allows an outer peripheral surface Sa of the transport belt 33 to be charged to positive polarity, and accordingly, the outer peripheral surface Sa of the transport belt 33 becomes an adsorption surface for adsorbing the medium.

A support roller 34 that makes contact with the medium is provided upstream of the line head 26. The support roller 34 pushes the medium to a part of the transport belt 33 wound around the driving pulley 31. The support roller 34 is grounded and therefore a charge on a recording surface side of the medium is removed.

Next, the first cleaning portion 35 is provided in the vicinity of the driven pulley 32. The first cleaning portion 35 includes a cleaning member that cleans the outer peripheral surface Sa of the transport belt 33 and a blade 36 which is an example of the first cleaning member. The blade 36 is fixed to a fixing member 37, and the fixing member 37 is rotatably provided around a rotation shaft 38.

The blade 36 is, for example, a plate-shaped elastic member having a predetermined thickness, formed of urethane, rubber, or the like, and can be elastically deformed while being in contact with the transport belt 33. A tip end of the blade 36 cleans the outer peripheral surface Sa of the transport belt 33 by being in contact with the portion of the transport belt 33 wound around the driven pulley 32.

The rotation shaft 38 rotates by a blade driving portion 59 (see FIG. 2), and the rotation shaft 38 rotates to be switched between a contact state (see FIG. 4) where the blade 36 is in contact with the transport belt 33 and a separation state (see FIG. 3) where the blade 36 is separated from the transport belt 33. A blade driving portion 59 (see FIG. 2) can include an actuator such as a motor. In addition, the control portion 50 adjusts an amount of rotation of the rotation shaft 38, such that a pressing force when the blade 36 presses against the transport belt 33 can be adjusted.

The transport belt 33 normally rotates in the contact state of the blade 36, and an adhering matter, such as ink adhering to the outer peripheral surface Sa of the transport belt 33 or paper dust, is thus removed.

Reference numeral Cb represents the contact position where the blade 36 is in contact with the transport belt 33. The contact position Cb is a position where a corner portion 36*a* of the blade 36 is in contact with the transport belt 33 in the present embodiment as illustrated in FIG. 5. The corner portion 36*a* is a corner portion facing the transport belt 33 in the blade 36.

Figure 5:
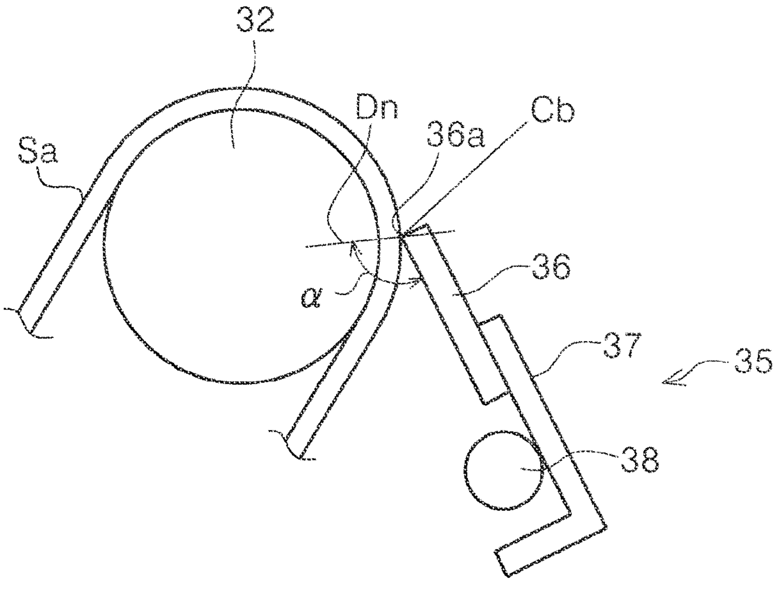
FIG. 5 is an enlarged view of the first cleaning portion.

In addition, a straight line Dn in FIG. 5 represents a normal line of the outer peripheral surface Sa of the transport belt 33 in the contact position Cb. The blade 36 makes contact with the transport belt 33 in a state where an angle $\alpha$ is formed by the normal line Dn. The blade 36 is oriented in a direction opposite to the transport belt 33 that rotates normally. FIG. 5 illustrates a moment when a corner portion 36*a* is in contact with the outer peripheral surface Sa of the transport belt 33 when the blade 36 is switched from the separation state to the contact state, and in the contact state of the blade 36, the rotation shaft 38 further rotates in the counterclockwise direction from the state of FIG. 5, and the blade 36 bends to some extent.

The blade 36 is provided at a position where the transport belt 33 is sandwiched between the blade 36 and the driven pulley 32 in the contact state, such that the transport belt 33 does not escape inside when the blade 36 is in contact with the transport belt 33, and a cleaning effect can be enhanced.

Next, referring back to FIGS. 3 and 4, the second cleaning portion 40 is provided downstream (−F direction) of the transport belt 33 of the first cleaning portion 35 in the normal rotation direction. The second cleaning portion 40 includes a cleaning sheet 41. The cleaning sheet 41 is wound around a driving pulley 42 and driven pulleys 43 and 44, and applied with a tension by a tensioner 45. The tensioner 45 is not limited to a configuration in which it is provided to be advanced to and retracted from the cleaning sheet 41, and the cleaning sheet 41 is pressed by a pressing member (not illustrated), and may be fixedly provided.

The cleaning sheet 41 is an endless, that is, ring shaped cloth in the present embodiment and has an outer peripheral surface 41*a* and an inner surface 41*b*, and the outer peripheral surface 41*a* can be pressed against the outer peripheral surface Sa of the transport belt 33 by the driven pulley 43.

The cleaning sheet 41, which is an example of the second cleaning member, can be formed of a single layer of cloth, and can be formed of a plurality of layers, in which the outer peripheral surface 41*a* is formed with the cleaning body and the inner surface 41*b* is formed with the reinforcing body. As an example of the cleaning body, cloth can be used, and as an example of the reinforcing body, a polyethylene terephthalate (PET) film can be used. Obviously, the cleaning body is not limited to the cloth, and other cleaning bodies may be used, and the reinforcing body is not limited to the PET sheet, and other reinforcing bodies may be used. The cleaning body is attached to an adhesive layer as an example of the reinforcing body. According to the configuration, the cleaning sheet 41 has high rigidity, such that wrinkles or deviation of the cleaning sheet 41 can be suppressed and a cleaning property can be improved.

In addition, because the cleaning sheet 41 is formed in a ring shape, it is possible to reduce in size and costs of the apparatus in comparison to a method for winding an elongated cleaning sheet. When the cleaning sheet 41 is formed in a ring shape, it is possible to form the cleaning sheet 41 in a ring shape, for example, by attaching one end region and the other end region of the sheet by a double-sided tape or the like.

The driving pulley 42 is rotatably driven by a sheet drive motor 61 (see FIG. 2). The driving pulley 42 is rotatably driven in the clockwise direction in FIG. 3, and accordingly, the cleaning sheet 41 is rotatably driven in the clockwise direction in FIG. 3.

The second cleaning portion 40 is movably provided along a direction in which it is advanced to and retracted from the transport belt 33, specifically, the G-axis direction, and receives power of a unit driving portion 60 (see FIG. 2) to be advanced to and retracted from the transport belt 33. The unit driving portion 60 can include an actuator such as a motor.

When the second cleaning portion 40 is advanced to the transport belt 33 as illustrated in FIG. 4, the cleaning sheet 41 is pressed against the transport belt 33 by the driven pulley 43, and in this state, the transport belt 33 rotates normally and the cleaning sheet 41 moves in a circulation manner, such that the outer peripheral surface Sa of the transport belt 33 is wiped. FIG. 3 illustrates a state where the second cleaning portion 40 is retracted from the transport belt 33.

Next, a paper dust removal wiper 46 is provided downstream (in −F direction) of the second cleaning portion 40 in the normal rotation direction of the transport belt 33. The paper dust removal wiper 46 is formed of a sheet material made of polyethylene terephthalate (PET) for example, and is disposed opposite to the normal rotation direction of the transport belt 33. The paper dust removal wiper 46 is fixedly provided and generally in contact with the transport belt 33 to remove paper dust adhering to the transport belt 33.

Reference numeral 48 represents a collection box that collects the removed paper dust. In addition, reference numeral 47 represents a contact sheet for the paper dust adhering to the paper dust removal wiper 46 when the transport belt 33 rotates reversely, so that the paper dust moves to the transport belt 33 and does not move upstream of the transport belt 33.

In this case, the driven pulley 32 is located downstream of the region facing the line head 26 when the transport belt 33 rotates normally, a space downstream of the blade 36 can be secured in the second section **33*b* opposite to the region of the transport belt 33 facing the line head 26, and a degree of freedom of the other configuration except for the blade 36 can be enhanced. In the present embodiment, the second cleaning portion 40, the paper dust removal wiper 46, and the contact sheet 47** can be disposed.

Instead of the configuration, the driving pulley 31 and the driven pulley 32 may be arranged reversely.

Next, the belt drive motor 57, the belt charging portion 58, the blade driving portion 59, the unit driving portion 60, and the sheet drive motor 61 are controlled by the control portion 50 as a control portion illustrated in FIG. 2.

The control portion 50 is a control portion that performs control on the entire printer 1, and controls the line head 26 or a medium transport motor (not illustrated) other than the configurations described above.

The control portion 50 includes a CPU 51 and a non-volatile memory 52, and the non-volatile memory 52 stores a program PR and various parameters for controlling various controls of the printer 1. The program PR includes a program for realizing various controls, which will be described later, and the non-volatile memory 52 stores data N1 necessary for executing the program PR.

A signal from an operation panel 54 is input to the control portion 50, and a signal for displaying information is output from the control portion 50 to a display portion **54*a* of the operation panel 54. Various setting information input via the operation panel 54 is stored in the non-volatile memory 52. The control portion 50** performs various controls based on the various setting information.

The control portion 50 includes an interface 53 for communication with an external computer 90. The control portion 50 acquires recording data, which is data for performing recording, generated by a printer driver operated by the external computer 90 or a printer driver of the control portion 50. Each mechanism site including the line head 26 is controlled based on the recording data. The recording data also includes medium size information.

Moreover, detection signals of various sensors are input to the control portion 50, and the control portion 50 performs necessary control based on the detection signals. FIG. 2 illustrates an upstream sensor 65 and a downstream sensor 66, which are parts of the various sensors.

As illustrated in FIGS. 3 and 4, the upstream sensor 65 is provided upstream of the line head 26, which is a position facing the transport belt 33. In addition, the downstream sensor 66 is provided downstream of the line head 26, which is a position facing the transport belt 33. The upstream sensor 65 and the downstream sensor 66 are optical sensors having a light emitting portion that emits light toward the transport belt 33 and a light receiving portion that receives the light reflected from the transport belt 33 or the medium. The control portion 50 can detect passage of a leading end or trailing end of the medium at the position of the upstream sensor 65 based on the detection signal of the upstream sensor 65, and can detect a passage of the leading end or trailing end of the medium at a position of the downstream sensor 66.

In particular, when the passage of the leading end of the medium at the position of the downstream sensor 66 cannot be detected even if a certain time has elapsed after the passage of the leading end of the medium at the position of the upstream sensor 65 has been detected, the control portion 50 determines that a jam of the medium occurs. When it is determined that the jam of the medium occurs, the control portion 50 stops a recording operation. The stopping of the recording operation includes stopping ejection of the ink from the line head 26 or stopping the driving of the transport belt 33 or another transport roller pair.

In the present embodiment, the control portion 50 uses at least one of the first cleaning portion 35 and the second cleaning portion 40 to clean the outer peripheral surface Sa of the transport belt 33. The control portion 50 can select a first cleaning mode that uses only the first cleaning portion 35, a second cleaning mode that uses all the first cleaning portion 35 and the second cleaning portion 40, and a third cleaning mode that uses only the second cleaning portion 40.

An example of a case of selecting the first cleaning mode by the control portion 50 includes a case during a regular cleaning operation. The control portion 50 includes a unit that counts an elapsed time after executing the regular cleaning operation, when the elapsed time from the execution of the regular cleaning operation reaches a predetermined time, the control portion 50 executes the regular cleaning operation. In addition, the first cleaning mode is also performed when the printer 1 transitions to a standby state after a recording jam has been completed.

An example of a case of selecting the second cleaning mode by the control portion 50 includes a case where the jam of the medium occurs. When such a jam of the medium occurs, the ink may be erroneously ejected and adhere to the transport belt 33, and thus the control portion 50 executes a cleaning operation in the second cleaning mode.

An example of a case of selecting the third cleaning mode by the control portion 50 includes a case where the number of times of execution of the double-side recording reaches a predetermined value or a case where dew condensation may occur on the transport belt 33. The control portion 50 includes a unit that counts the number of times of execution of the double-sided recording, when the number of times of execution of the double-sided recording reaches the predetermined value, the control portion 50 executes the cleaning operation in the third cleaning mode. When the double-sided recording is performed, the first surface, on which the recording is initially performed, is in contact with the transport belt 33 when the recording is performed on the second surface opposite to the first surface; this is because the ink may adhere to the transport belt 33. In addition, when the dew condensation occurs on the transport belt 33, the control portion 50 executes the cleaning operation in the third cleaning mode because the medium may get wet. An example of a case where the due condensation may occur on the transport belt 33 includes a case where a humidity suddenly changes to be high or a case where a temperature rises sharply from a state where the transport belt 33 is left at a low temperature.

Figure 6:
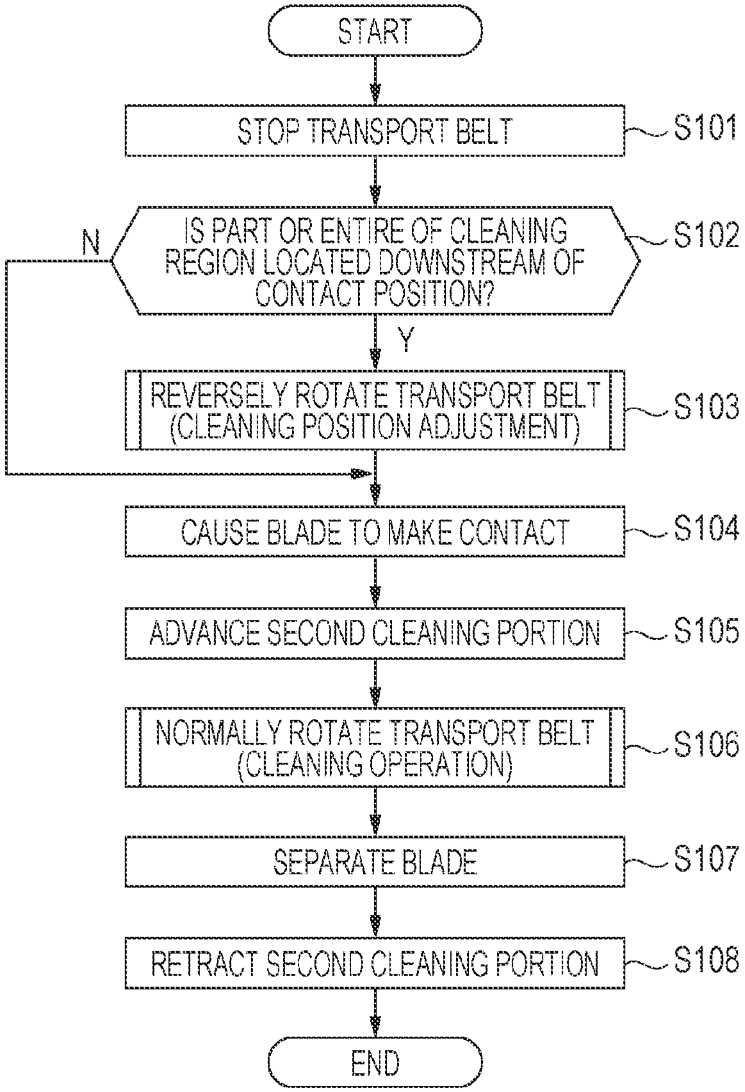
FIG. 6 is a flowchart illustrating a first embodiment of a control when the transport belt is cleaned.

Next, a first embodiment of a control in which the blade 36 cleans the transport belt 33 will be described with reference to FIGS. 6 to 8. The present embodiment is a control example when the above-described second cleaning mode is performed, that is, a control example of cleaning performed due to erroneous ejection of the ink to the transport belt 33. However, neither the present embodiment nor the second embodiment to be described later is limited to the control that is due to the erroneous ejection of the ink.

The control portion 50 stops driving of the transport belt 33 when it detects the jam of the medium (step S101). Next, the control portion 50 determines whether a region where the ink is erroneously ejected, that is, a part or entire of the cleaning region where the cleaning is to be performed by the blade 36 is located downstream of the contact position Cb in the normal rotation direction (step S102). In FIG. 7, reference numeral Ra is an example of the cleaning region. The control portion 50 can assume that the ink is ejected from the line head 26 to the transport belt 33, for example, between a timing when the upstream sensor 65 has detected a leading end of a medium P and a timing when the driving of the transport belt 33 is stopped, and a region thereof can be set as a cleaning region Ra. FIG. 7 illustrates a state where in which the leading end of the medium P is caught in the line head 26 and jammed.

Figure 7:
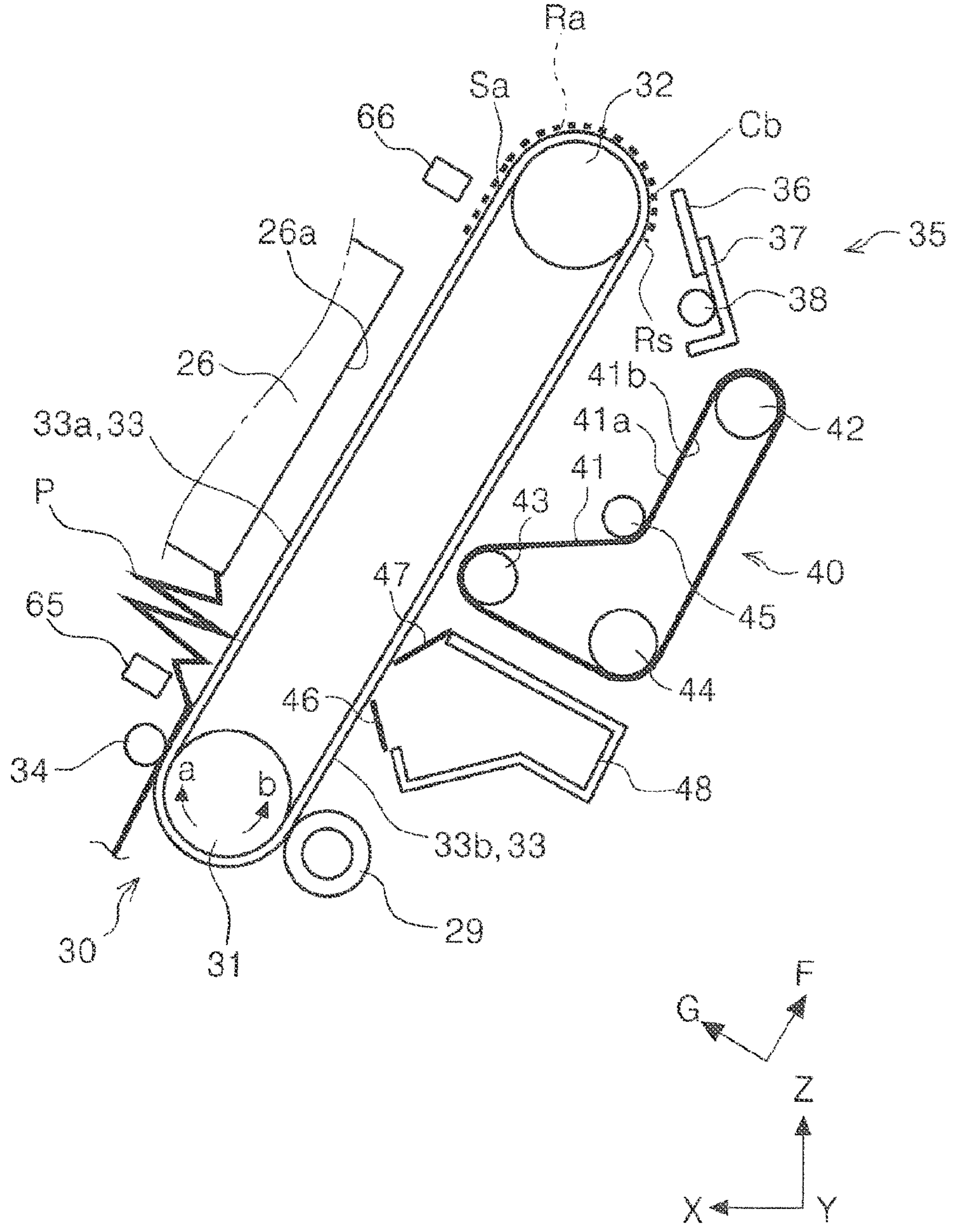
FIG. 7 is a diagram illustrating a positional relationship between a cleaning region and a blade when the transport belt is cleaned.

In the example of FIG. 7, a part of the cleaning region Ra is located downstream of the contact position Cb in the normal rotation direction. However, for example, when a margin at the leading end of the medium is small and recording is performed only at the leading end of the medium, the entire of the cleaning region Ra is located downstream of the contact position Cb in the normal rotation direction. Alternatively, when the margin at the leading end of the medium is large, the entire of the cleaning region Ra is located upstream of the contact position Cb in the normal rotation direction.

When a part or entire of the cleaning region Ra is located downstream of the contact position Cb in the normal rotation direction (step S102: Yes), the control portion 50 reversely rotates the transport belt 33 (step S103). The reverse rotation of the transport belt 33 is an operation in which the entire of the cleaning region Ra is disposed upstream of the contact position Cb in the normal rotation direction as illustrated in FIG. 8, which is referred to as cleaning position adjustment control.

Figure 8:
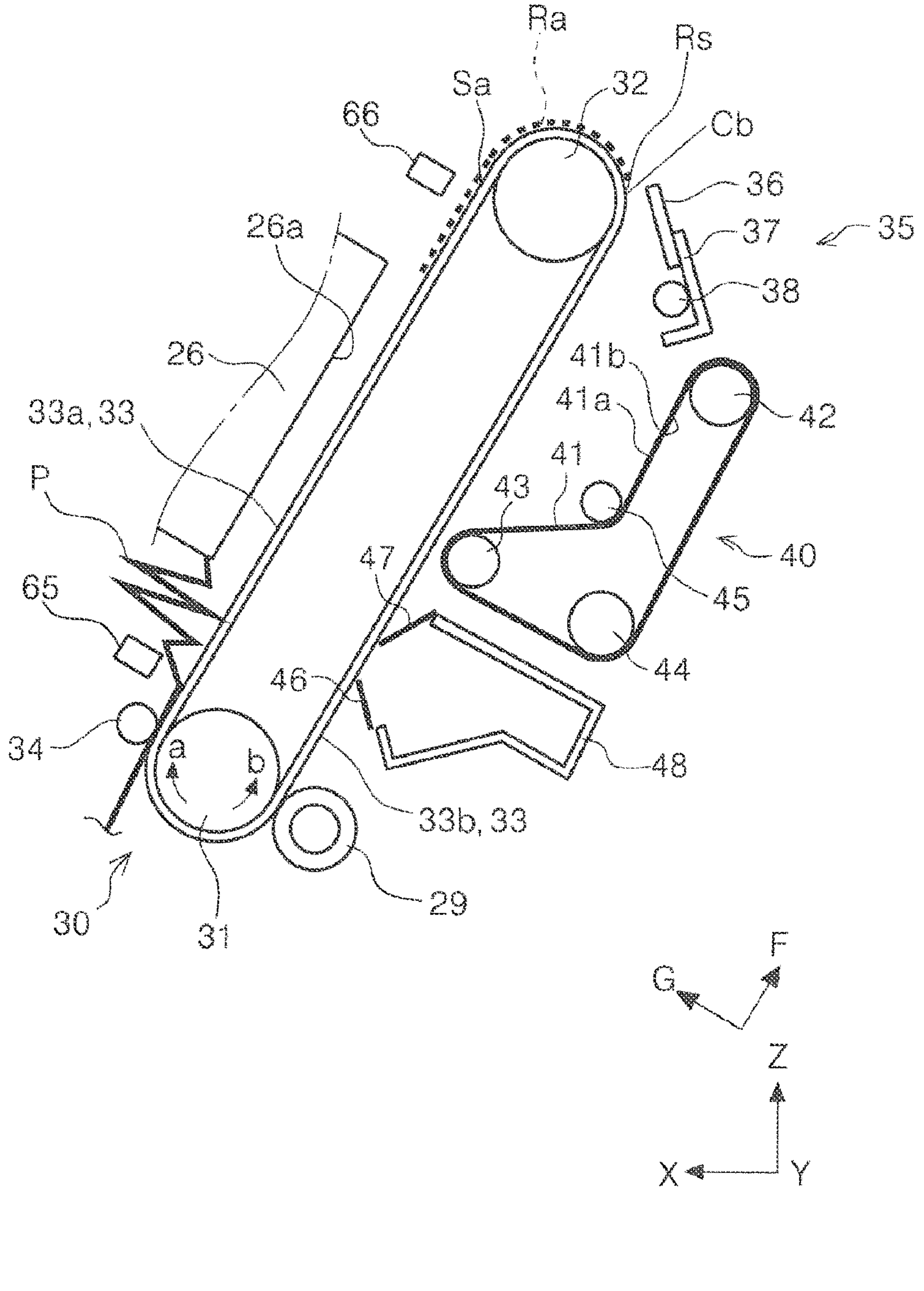
FIG. 8 is a view illustrating a positional relationship between the cleaning region and the blade when the transport belt is cleaned.

For example, FIG. 8 illustrates that the transport belt 33 rotates reversely so that a downstream end Rs of the cleaning region Ra faces the contact position Cb. However, a predetermined distance between the downstream end Rs of the cleaning region Ra and the contact position Cb may be provided by moving the cleaning region Ra further upstream in the normal rotation direction.

When a part or entire of the cleaning region Ra is not located downstream of the contact position Cb in the normal rotation direction, that is, when the entire of the cleaning region Ra is located upstream of the contact position Cb in the normal rotation direction (step S102: No), the cleaning position adjustment control (step S103) is skipped, and the process proceeds to step S104. In the present embodiment, when a part or entire of the cleaning region Ra is not located downstream of the contact position Cb in the normal rotation direction, the downstream end Rs of the cleaning region Ra faces the contact position Cb, in other words, the downstream end Rs of the cleaning region Ra matches the contact position Cb.

Next, the control portion 50 switches the blade 36 to the contact state (step S104), advances the second cleaning portion 40 to the transport belt 33 (step S105), and then normally rotates the transport belt 33 (step S106). The normal rotation of the transport belt 33 in step S106 is a cleaning operation of the transport belt 33 by the blade 36 and the second cleaning portion 40. In the cleaning operation, an amount of normal rotation of the transport belt 33 is an amount of cleaning the cleaning region Ra at least once with the blade 36 and the second cleaning portion 40, and may be an amount of cleaning the cleaning region Ra plural times by the blade 36 and the second cleaning portion 40.

When the cleaning operation is completed, the control portion 50 switches the blade 36 to the separation state (step S107) and retracts the second cleaning portion 40 from the transport belt 33 (step S108).

In the control example, steps S103 to S108 may be repeatedly performed. That is, the cleaning region Ra may be repeatedly cleaned by repeatedly executing the advance/retraction operation of the blade 36 and the reverse and normal operation of the transport belt 33 and reciprocating the cleaning region Ra with respect to the contact position Cb. The same applies to the second embodiment, which will be described later.

Figure 9:
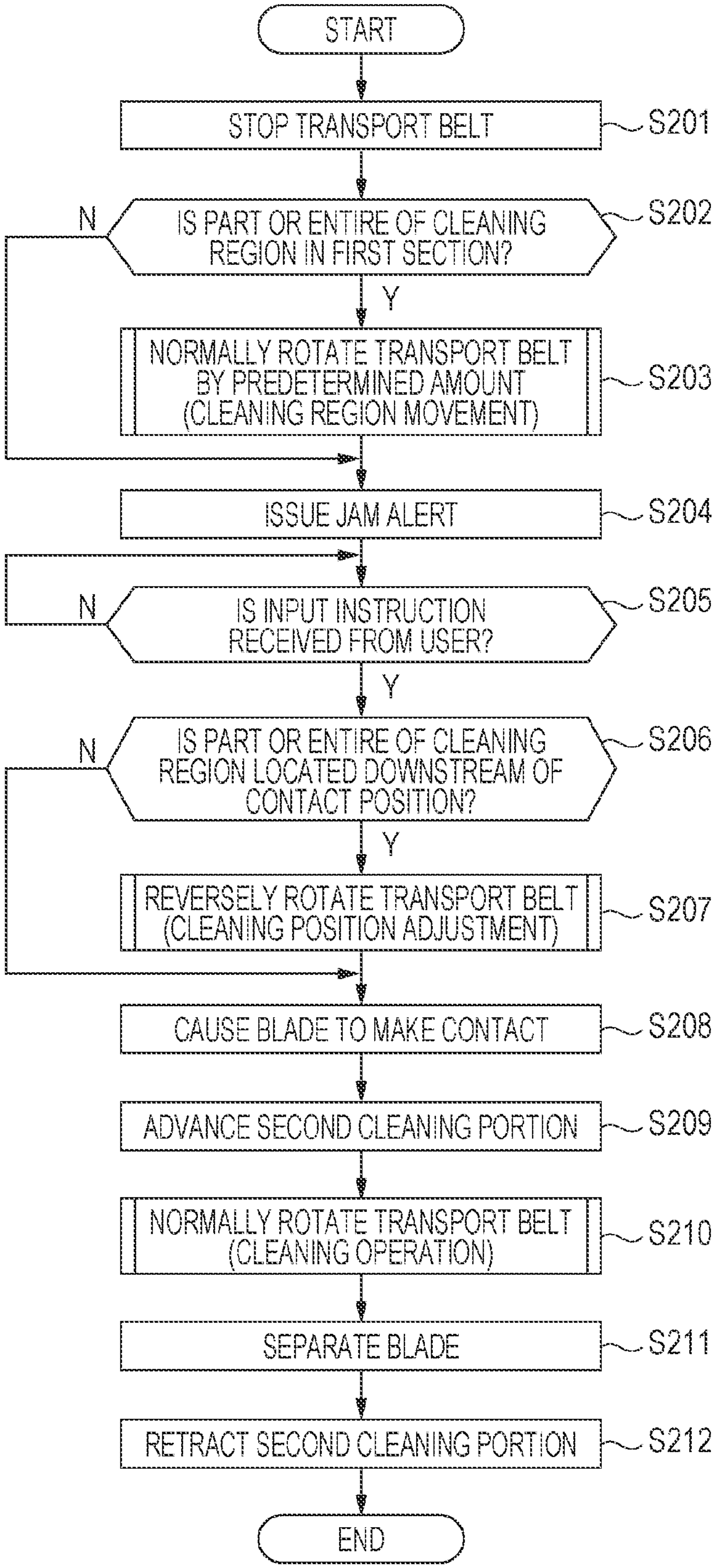
FIG. 9 is a flowchart illustrating a second embodiment of a control when the transport belt is cleaned.

Next, a second embodiment of a control in which the blade 36 cleans the transport belt 33 will be described with reference to FIGS. 9 and 10. The present embodiment is also a control example when the above-described second cleaning mode is performed, that is, a control example of cleaning performed due to erroneous ejection of the ink to the transport belt 33.

The control portion 50 stops driving of the transport belt 33 when it detects the jam of the medium (step S201). Next, the control portion 50 determines whether the first section 33*a* of the transport belt 33 includes a part or entire of the cleaning region Ra (step S202). When the first section 33*a* of the transport belt 33 includes a part or entire of the cleaning region Ra (step S202: Yes) the control portion 50 normally rotates the transport belt 33 by a predetermined amount (step S203).

FIG. 7 is an example in which the first section 33*a* of the transport belt 33 includes a part of the cleaning region Ra. In addition, FIG. 10 is an example of a state where the transport belt 33 rotates normally by a predetermined amount in step S203. The normal operation of the transport belt 33 in step S203 is an operation in which the transport belt 33 normally rotates until the cleaning region Ra is out of the first section 33*a*, which is cleaning region movement control. When the first section 33*a* of the transport belt 33 includes a part or entire of the cleaning region Ra (step S202: No) the cleaning region movement control in step S203 is skipped.

The control portion 50 issues a jam alert (step S204). Specifically, for example, the control portion 50 causes the display portion 54*a* of the operation panel 54 to display an alert message such as "A paper jam has occurred. Please remove the jammed paper". When the control portion 50 issues the jam alert, a space may be formed between the line head 26 and the transport belt 33 by moving the line head 26 in the +G direction, as indicated by reference numeral 26-1 in FIG. 10.

Figure 11:
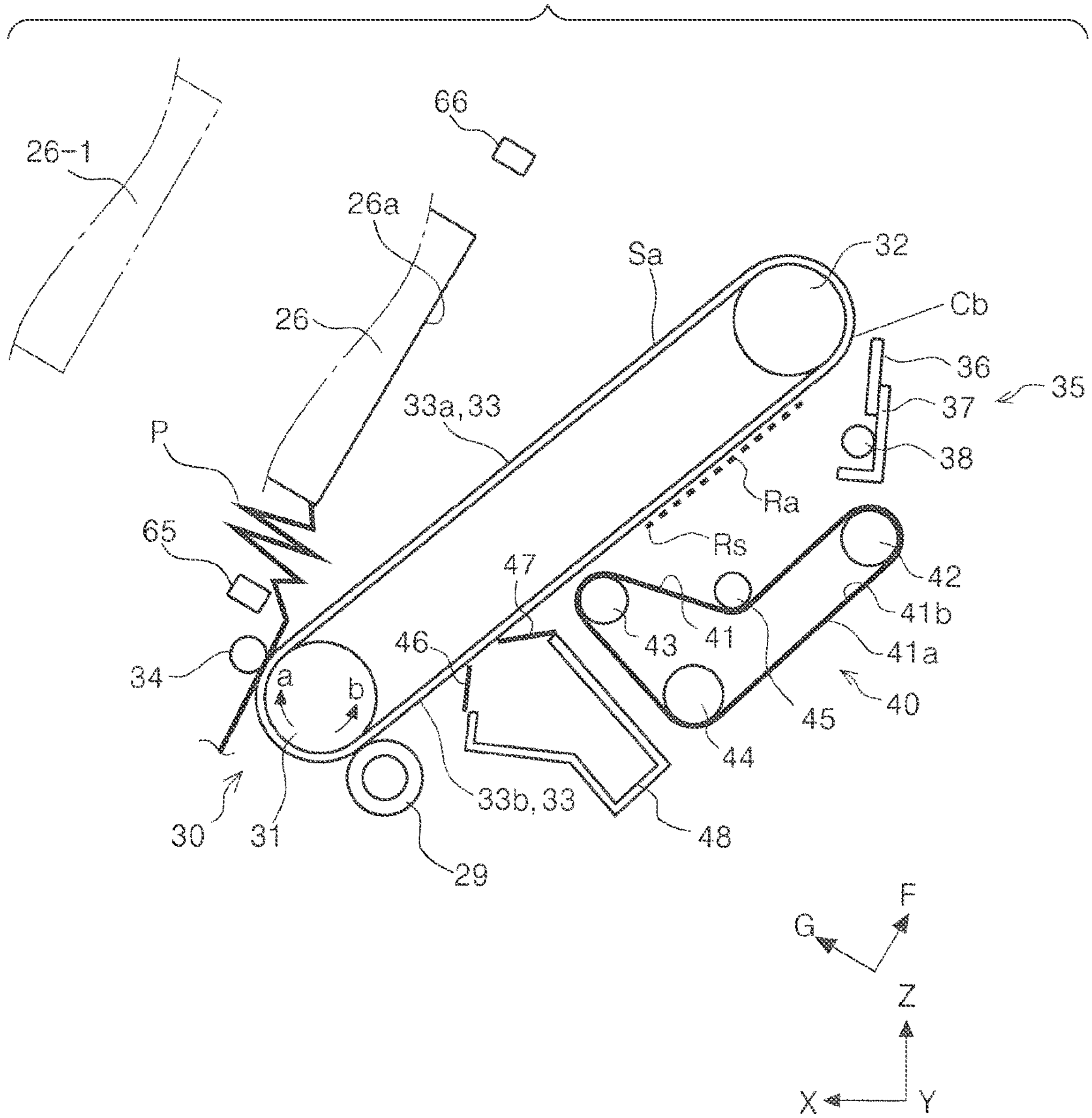
FIG. 11 is a view illustrating a configuration in which the transport belt is retracted from a line head.

Instead of moving the line head 26 in the +G direction or in addition to moving the line head 26 in the +G direction, the transport belt 33 may move in a direction retracted from the line head 26 as illustrated in FIG. 11. In the embodiment illustrated in FIG. 11, the belt unit 30 can rotate around the driving pulley 31. In addition, in the embodiment illustrated in FIG. 11, in addition to the belt unit 30, the first cleaning portion 35, the second cleaning portion 40, the charging roller 29, the paper dust removal wiper 46, the contact sheet 47, and the collection box 48, which are configurations in the vicinity of the transport belt 33, can integrally rotate with the belt unit 30. The rotation of the belt unit 30 in this manner may be performed by a user's operation or performed by the control portion 50 using a drive source such as a motor.

Returning to FIG. 9, when the user removes the jammed medium in response to the jam alert and presses an OK button (step S205: Yes), the control portion 50 performs control after step S206. The control after step S206 is the same as the control after step S102 described with reference to FIG. 6, the description thereof will be omitted below. Steps S206, S207, S208, S209, S210, S211, and S212 correspond to steps S102, S103, S104, S105, S106, S107, and S108 in FIG. 6, respectively.

As described above, when at least a part of the cleaning region Ra is located downstream of the contact position Cb where the blade 36 is in contact with the transport belt 33 in the normal rotation direction of the transport belt 33 during cleaning of the cleaning region Ra, the control portion 50 can execute the cleaning position adjustment control (steps S103 and S207) to rotate reversely the transport belt 33 so that the entire of the cleaning region Ra is located upstream of the contact position Cb in a normal rotation direction, before the blade 36 is switched from the separation state to the contact state.

In addition, in the control method performed by the control portion 50, when at least a part of the cleaning region Ra is located downstream of the contact position Cb where the blade 36 is in contact with the transport belt 33 in the normal rotation direction of the transport belt 33 during cleaning of the cleaning region Ra, the transport belt 33 rotates reversely so that the entire of the cleaning region Ra is located upstream of the contact position Cb in the normal rotation direction, before the blade 36 is switched from the separation state to the contact state.

In addition, the program executed by the control portion 50 includes: determining whether or not at least a part of the cleaning region Ra is located downstream of the contact position Cb in the normal rotation direction of the transport belt 33 during cleaning of the cleaning region Ra (steps S102 and S206); and reversely rotating the transport belt 33 so that the entire of the cleaning region Ra is located upstream of the contact position Cb in the normal rotation direction before the blade 36 is switched from the separation state to the contact state, when at least a part of the cleaning region Ra is located downstream of the contact position Cb in the normal rotation direction (steps S103 and S207).

As described above, the amount of normal rotation of the transport belt 33 necessary for cleaning the entire of the cleaning region Ra once can be suppressed, and the time to complete the cleaning can be reduced.

Moreover, the control portion 50 reversely rotates the transport belt 33 in the cleaning position adjustment control (steps S103 and S207) so that the downstream end Rs of the cleaning region Ra in the normal rotation direction faces the contact position Cb, such that the amount of reverse rotation of the transport belt 33 can be minimized, and the time to complete the cleaning can be further reduced in the cleaning position adjustment control.

The blade 36 is switched to the contact state while forming a predetermined angle of the outer peripheral surface Sa of the transport belt 33 with respect to the normal line Dn, when the blade 36 is switched from the separation state to the contact state as illustrated in FIG. 5. In such a configuration, because the side surface of the blade 36 makes contact with the transport belt 33, once the side surface of the blade 36 makes contact with the middle of the cleaning region Ra, the ink adheres to the side surface of the blade 36, that is, to a place that is not originally used for cleaning, the cleaning effect may be adversely affected. However, according to the cleaning position adjustment control described above, the side surface of the blade 36 does not make contact with the middle of the cleaning region Ra, such that it is possible to avoid adversely affecting the cleaning effect.

Moreover, when the first section 33*a* of the transport belt 33 includes at least a part of the cleaning region Ra, the control portion 50 executes cleaning region movement control (step S203) to normally rotate the transport belt 33 until the cleaning region Ra is at least out of the first section 33*a* before executing the cleaning position adjustment control (step S207).

Accordingly, when the user tries to remove the medium P remaining on the transport belt 33, the user touches the cleaning region Ra, resulting in contamination of fingers.

In the embodiment described above, the cleaning region movement control is performed when the first section 33*a* of the transport belt 33 includes at least a part of the cleaning region Ra. However, when the user may touch a section of the belt wound around the driven pulley 32, for example, the cleaning region movement control may be performed when at least a part of the cleaning region Ra is included in the first section 33*a* of the transport belt 33 and the section (part or entire) of the belt wound around the driven pulley 32.

Moreover, in the embodiment described above, the control portion 50 normally rotates the transport belt 33 until the entire of the cleaning region Ra enters the second section 33*b* in the cleaning region movement control (step S203). Therefore, it is possible to reliably suppress the touch to the erroneously ejected region by the user.

However, a movement destination of the cleaning region Ra is not limited to the position where the entire of the cleaning region Ra enters the second section 33*b* as long as it is possible to suppress the touch to the erroneously ejected region by the user. For example, a part of the cleaning region Ra may be the section of the belt wound around the driven pulley 32.

Figure 10:
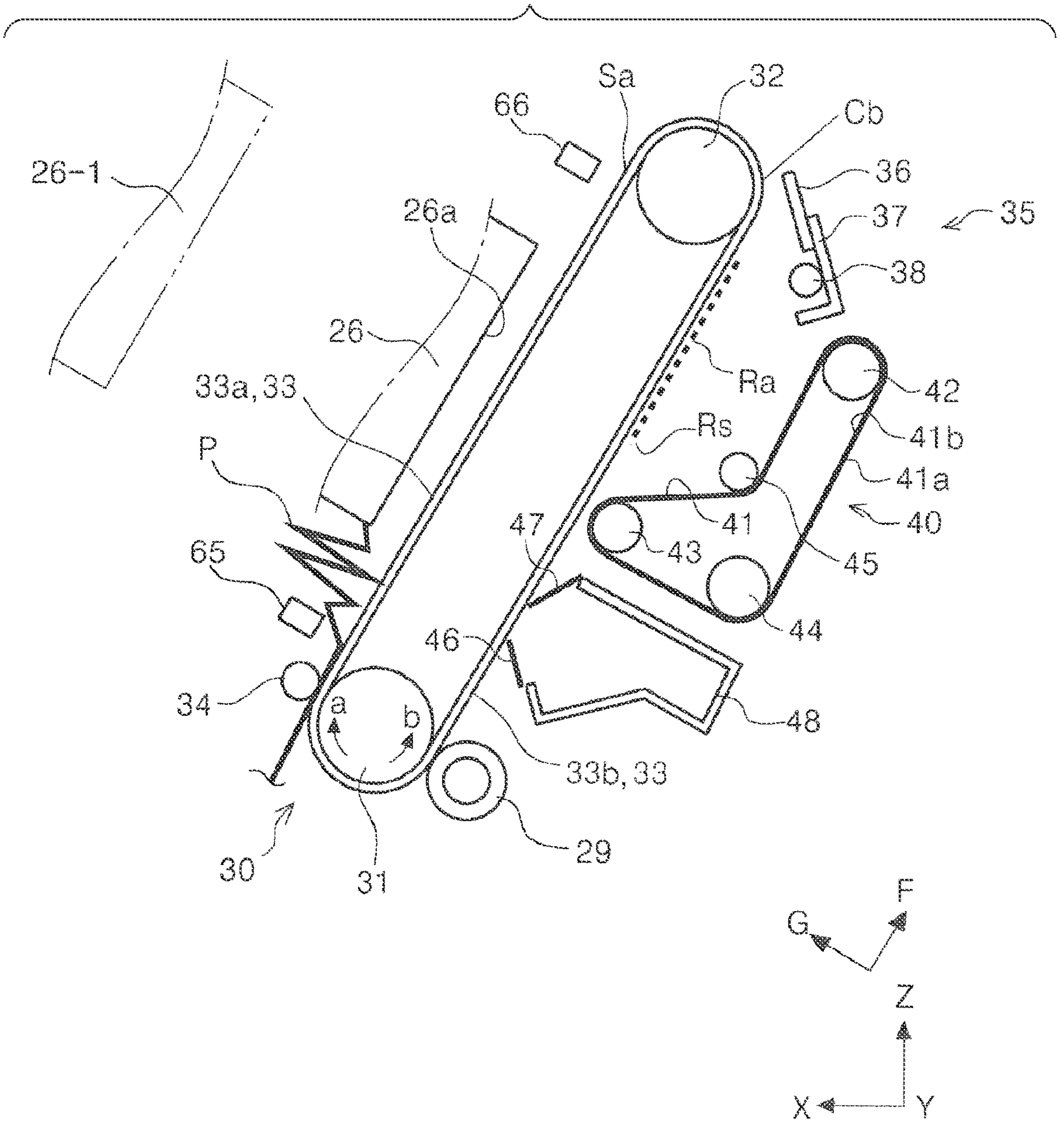
FIG. 10 is a view illustrating a positional relationship between the cleaning region and the blade when the transport belt is cleaned.

Moreover, in the cleaning region movement control, the control portion 50 stops the transport belt 33 in a state where the entire of the cleaning region Ra is located upstream in the second section 33*b* after the entire of the cleaning region Ra enters the second section 33*b* as illustrated in FIG. 10. The expression "the entire of the cleaning region Ra is located upstream in the second section 33*b*" herein means that an intermediate position of the cleaning region Ra in a belt movement direction is located in the +F direction relative to the intermediate position of the second section 33*b*.

The movement destination of the cleaning region Ra is set in this manner, such that the amount of reverse rotation of the transport belt 33 when performing the cleaning position adjustment control (step S207) can be suppressed, and the cleaning operation of the transport belt 33 can be started quickly.

Moreover, after executing the cleaning region movement control, the control portion 50 suspends the cleaning position adjustment control (step S207) until the input instruction is received from the user (step S205: Yes), and executes the cleaning position adjustment control when receiving the input instruction. More specifically, in the present embodiment, after executing the cleaning region movement control, the control portion 50 issues an alert for prompting the removal of the medium on the transport belt 33 (step S204), suspends the cleaning position adjustment control (step S207) until the input instruction is received from the user (step S205: Yes), and executes the cleaning position adjustment control when receiving the input instruction. Therefore, it is possible to reliably suppress the touch to the cleaning region Ra by the user.

Moreover, in the present embodiment, the charging roller 29, which is a contact portion that is in contact with the transport belt 33, is provided downstream of the contact position Cb in the normal rotation direction of the transport belt 33. In such a configuration, the charging roller 29 is easily contaminated by the ink. However, since the blade 36 is located upstream of the charging roller 29 in the normal rotation direction, the contamination of the charging roller 29 by the ink can be suppressed.

In addition, it is possible to suppress an increase in cost and size of the apparatus, as compared with a case where the charging roller 29 can be advanced to and retracted from the transport belt 33 because the contamination of the charging roller 29 by the ink is suppressed.

In the present embodiment, the paper dust removal wiper 46 and the contact sheet 47 are also examples of the contact portion.

Moreover, in the present embodiment, the second cleaning portion 40 is provided downstream of the contact position Cb in the normal rotation direction of the transport belt 33, such that it is possible to enhance the cleaning effect of the transport belt 33.

Next, another embodiment of the periphery configuration of the belt unit 30 will be described with reference to FIGS. 12 and 13. The same components as those already described in FIGS. 12 and 13 are designated by the same reference numerals, and hereinafter, the duplicate description thereof will be omitted.

Figure 12:
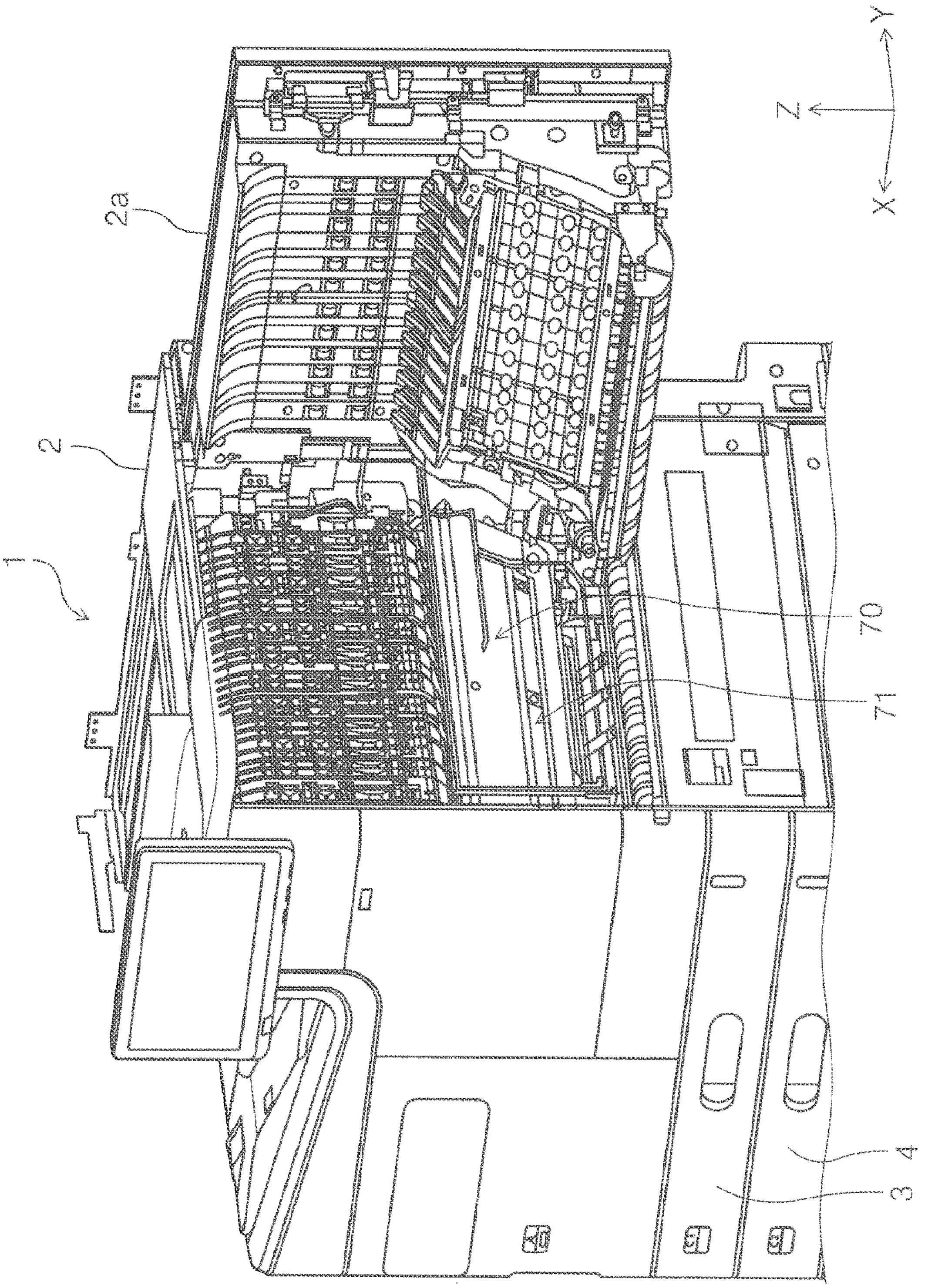
FIG. 12 is a view illustrating a state where an opening/closing cover on a right side of an apparatus body is opened.
Figure 13:
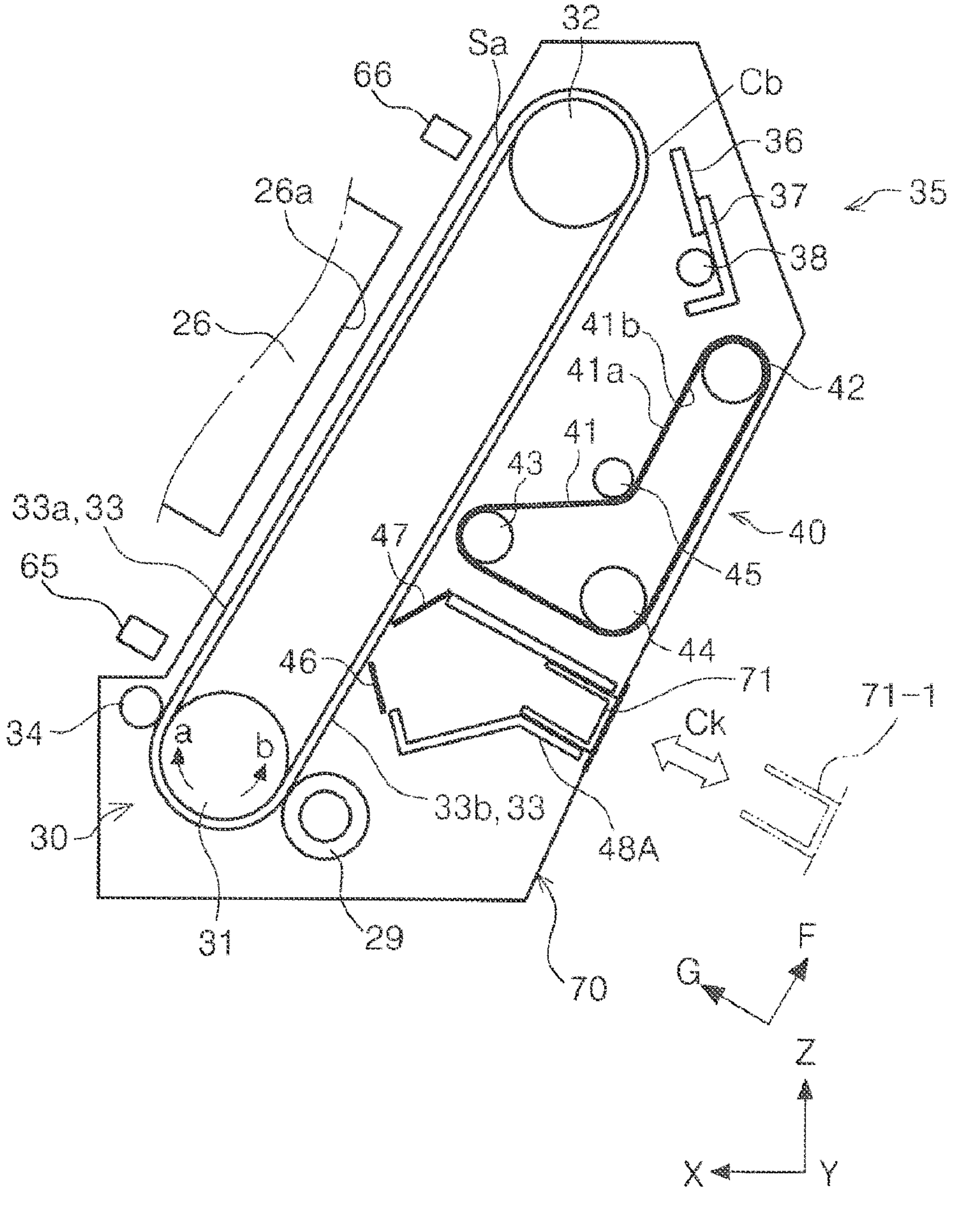
FIG. 13 is a side view of a transport belt, a first cleaning portion, and a second cleaning portion.

Reference numeral 70 in FIGS. 12 and 13 represents a transport unit. The transport unit 70 is a unit body including the above-described belt unit 30, first cleaning portion 35, and second cleaning portion 40, and a collection box 48A, which is another embodiment of the collection box 48.

An opening/closing cover 2*a* is provided on the side surface (right side surface) of the apparatus body 2 in the –X direction, and FIG. 12 illustrates a state where the opening/closing cover 2*a* is opened. The opening/closing cover 2*a* as illustrated is opened to expose the transport unit 70. The opening/closing cover 2*a* is opened, such that the jammed medium can also be removed when a paper jam occurs in the media transport path.

According to the present embodiment, the collection box 48A includes a box 71 that can be detached from the transport unit 70, as indicated by arrow Ck. FIG. 13 illustrates that a chain double dashed line indicated by reference numeral 71-1 indicates a detachable box 71 that has been removed. The detachable box 71 can be attached to the transport unit 70 using screws (not illustrated), and the detachable box 71 can be removed from the transport unit 70 by removing the screws.

By opening the opening/closing cover 2*a*, the detachable box 71 can be exposed together with the transport unit 70 as illustrated in FIG. 12 and the detachable box 71 can be detached from the transport unit 70.

Because paper dust collected by the collection box 48A is accumulated in the detachable box 71, the detachable box 71 is removed from the transport unit 70, such that the accumulated paper dust can be easily discarded.

In the present embodiment, the detachable box 71 is attached to the transport unit 70 using the screws, but the present disclosure is not limited thereto, and obviously, other attachment units such as snap-fits or magnets may be used.

Furthermore, the present disclosure is not limited to the aforementioned embodiments. Various modifications can be made within the scope of the disclosure defined by the appended claims, and such modifications should be included in the scope of the present disclosure.

What is claimed is:

1. A liquid ejecting apparatus comprising:

a liquid ejecting portion that ejects a liquid onto a medium;

a transport belt that faces the liquid ejecting portion and rotates in a normal rotation direction to transport the medium downstream in a transport direction;

a cleaner that makes contact with the transport belt to clean a cleaning region on the transport belt, in which the cleaner is configured to be switched between a contact state of being in contact with the transport belt and a separation state of being separated from the transport belt and is switched from the separation state to the contact state when cleaning the transport belt; and a control portion that controls an ejecting operation of the liquid by the liquid ejecting portion, a rotating operation of the transport belt, and switching of a state of the cleaner, wherein when, in cleaning the cleaning region, at least a part of the cleaning region is located, in the normal rotation direction of the transport belt, downstream of a contact position where the cleaner is in contact with the transport belt, the control portion is configured to execute, before the cleaner is switched from the separation state to the contact state, cleaning position adjustment control to rotate the transport belt in a reverse rotation direction opposite to the normal rotation direction so that an entire of the cleaning region is located upstream of the contact position in the normal rotation direction.

2. The liquid ejecting apparatus according to claim 1, wherein in the cleaning position adjustment control, the control portion rotates the transport belt in the reverse rotation direction so that a downstream end of the cleaning region in the normal rotation direction faces the contact position.

3. The liquid ejecting apparatus according to claim 1, wherein the cleaner includes a blade, and the blade is switched to the contact state while forming a predetermined angle to a direction normal to a surface of the transport belt, when the blade is switched from the separation state to the contact state.

4. The liquid ejecting apparatus according to claim 3, wherein the transport belt is wound around a first pulley and a second pulley, and the blade is provided at a position where the transport belt is sandwiched between the blade and the second pulley in the contact state.

5. The liquid ejecting apparatus according to claim 4, wherein the second pulley is located downstream of a region facing the liquid ejecting portion when the transport belt rotates in the normal rotation direction.

6. The liquid ejecting apparatus according to claim 1, wherein the transport belt has a first section that is a flat section and that includes a region facing the liquid ejecting portion, the cleaning region is a region where the liquid is erroneously ejected from the liquid ejecting portion, and when the first section includes at least a part of the cleaning region, the control portion executes cleaning region movement control to rotate the transport belt in the normal rotation direction until the cleaning region is at least out of the first section before executing the cleaning position adjustment control.

7. The liquid ejecting apparatus according to claim 6, wherein the transport belt has a second section that is a flat section and that includes a second section opposite to the first section, and the control portion rotates the transport belt in the normal rotation direction until the entire of the cleaning region enters the second section in the cleaning region movement control.

8. The liquid ejecting apparatus according to claim 7, wherein in the cleaning region movement control, the control portion stops the transport belt in a state where the entire of the cleaning region is located upstream in the second section after the entire of the cleaning region enters the second section.

9. The liquid ejecting apparatus according to claim 6, wherein after executing the cleaning region movement control, the control portion suspends the cleaning position adjustment control until an input instruction is received from the user, and executes the cleaning position adjustment control when receiving the input instruction.

10. The liquid ejecting apparatus according to claim 1, further comprising:

a contact portion that is in contact with the transport belt and is provided downstream of the contact position in the normal rotation direction of the transport belt.

11. The liquid ejecting apparatus according to claim 1, further comprising:

a second cleaner that cleans the transport belt and is provided downstream of the contact position in the normal rotation direction of the transport belt, wherein the cleaner is a first cleaner.

12. The liquid ejecting apparatus according to claim 11, wherein the second cleaner includes a ring shaped cleaning body that cleans the transport belt, and a reinforcing body that adheres to an inner periphery of the cleaning body and reinforces the cleaning body.

13. A method for controlling a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt and is switched from the separation state to the contact state when cleaning the transport belt, the method comprising:

rotating the transport belt in a reverse rotation direction opposite to a normal rotation direction so that an entire of the cleaning region is located upstream of a contact position in the normal rotation direction before the cleaner is switched from the separation state to the contact state, when, in cleaning the cleaning region, at least a part of the cleaning region is located, in the normal rotation direction of the transport belt, downstream of the contact position where the cleaner is in contact with the transport belt.

14. A non-transitory computer-readable storage medium storing a program executed by a control portion of a liquid ejecting apparatus, which includes a liquid ejecting portion that ejects a liquid onto a medium, a transport belt that faces the liquid ejecting portion and transports the medium, and a cleaner that makes contact with the transport belt to clean a cleaning region on the transport belt, in which the cleaner is configured to be switched between a contact state of being in contact with the transport belt and a separation state of being separated from the transport belt, and is switched from the separation state to the contact state when cleaning the transport belt, the program comprising:

determining whether or not at least a part of the cleaning region in cleaning the cleaning region is provided downstream of a contact position where the cleaner is in contact with the transport belt in a normal rotation direction of the transport belt; and rotating the transport belt in a reverse rotation direction opposite to the normal rotation direction so that an entire of the cleaning region is located upstream of the contact position in the normal rotation direction before the cleaner is switched from the separation state to the contact state, when at least a part of the cleaning region is located downstream of the contact position in the normal rotation direction.

* * * * *